US007196438B2

(12) United States Patent
Williams et al.

(10) Patent No.: US 7,196,438 B2
(45) Date of Patent: Mar. 27, 2007

(54) RESILIENT ISOLATION MEMBERS AND RELATED METHODS OF REDUCING ACOUSTIC NOISE AND/OR STRUCTURAL VIBRATION IN AN ELECTRIC MACHINE

(75) Inventors: Donald J Williams, Pierron, IL (US); Gary E Horst, Ballwin, MO (US); Chetan O Modi, Valley Park, MO (US); Michael L McCelland, Leeds (GB)

(73) Assignee: Emerson Electric Co., St. Louis, MO (US)

( * ) Notice: Subject to any disclaimer, the term of this patent is extended or adjusted under 35 U.S.C. 154(b) by 0 days.

(21) Appl. No.: 11/127,506

(22) Filed: May 12, 2005

(65) Prior Publication Data

US 2006/0255666 A1    Nov. 16, 2006

(51) Int. Cl.
  *H02K 5/24* (2006.01)
(52) U.S. Cl. .......................................... 310/51; 310/89
(58) Field of Classification Search .................. 310/51, 310/89–90, 254, 258
  See application file for complete search history.

(56) References Cited

U.S. PATENT DOCUMENTS

| 2,810,084 | A | * | 10/1957 | Sprando | 310/60 R |
| 3,270,221 | A | * | 8/1966 | Shaffer | 310/51 |
| 3,394,908 | A | * | 7/1968 | Irvin | 248/605 |
| 4,186,319 | A | * | 1/1980 | Dochterman | 310/89 |
| 4,894,574 | A | * | 1/1990 | Ragaly | 310/258 |
| 5,126,607 | A | * | 6/1992 | Merriman, Jr. | 310/51 |
| 5,497,039 | A | * | 3/1996 | Blaettner et al. | 310/51 |
| 5,530,304 | A | * | 6/1996 | Mirumachi et al. | 310/51 |
| 5,917,258 | A | | 6/1999 | Kershaw et al. | |
| 5,945,756 | A | | 8/1999 | Periyathamby et al. | |
| 6,147,426 | A | | 11/2000 | Lepi et al. | |
| 6,197,885 | B1 | | 3/2001 | Yamashita et al. | |
| 2001/0024071 | A1 | | 9/2001 | Yoshida et al. | |

(Continued)

FOREIGN PATENT DOCUMENTS

DE    1638182    4/1971

(Continued)

OTHER PUBLICATIONS

Patent Abstract of EP0521309, Electric Machine, in Particular Three-Phase Generator for Automotive Vehicles, 2 pages.

(Continued)

*Primary Examiner*—Thanh Lam
(74) *Attorney, Agent, or Firm*—Harness, Dickey & Pierce, P.L.C.

(57) ABSTRACT

A resilient isolation member is configured for use with an electric machine having a housing, a stator within the housing, and an end shield. The resilient isolation member includes first and second end portions, a sidewall extending between the first and second end portions, and a lip is disposed along an outer surface of the sidewall. The resilient isolation member is sized for mounting between the end shield and the stator, with the first and second end portions respectively abutting against a first inner portion of the end shield and a portion of the stator and with the lip abutting against a second inner portion of the end shield and a portion of the housing.

15 Claims, 10 Drawing Sheets

U.S. PATENT DOCUMENTS

2003/0094862 A1* 5/2003 Torrance et al. ............... 310/51
2004/0124720 A1   7/2004 Condamin et al.
2004/0145251 A1* 7/2004 Clouse et al. .................. 310/51
2006/0125330 A1* 6/2006 Winkler et al. ............... 310/51

FOREIGN PATENT DOCUMENTS

| DE | 4035583   | 5/1992  |
|----|-----------|---------|
| EP | 0 521 309 | 1/1993  |
| EP | 0 957 564 | 11/1999 |
| EP | 1 029 742 | 8/2000  |
| GB | 2 293 695 | 4/1996  |
| JP | 07250450  | 9/1995  |
| JP | 08023660  | 1/1996  |

OTHER PUBLICATIONS

Patent Abstract of Japan, Supporting Bush For AC Generator For Vehicle, Sep. 26, 1995, 1 page.
Patent Abstract of Japan, Alternator For Vehicle, Jan. 23, 1996, 1 page.

* cited by examiner

RESILIENT ISOLATION MEMBERS AND RELATED METHODS OF REDUCING ACOUSTIC NOISE AND/OR STRUCTURAL VIBRATION IN AN ELECTRIC MACHINE

FIELD OF THE INVENTION

The present invention generally relates to resilient isolation members for use in electric machines and related methods of reducing acoustic noise and/or structural vibration in such machines.

BACKGROUND OF THE INVENTION

During operation, electric machines can generate relatively high levels of stator torque pulsations. This, in turn, can result in structural vibration and acoustic noise at levels that are unacceptable (or at least undesirable) to the user or customer. But reducing acoustic noise can be difficult especially for liquid cooled motors because of the limitations imposed by the liquid cooing system and high belt loads and torques typical of such motors.

SUMMARY OF THE INVENTION

According to one aspect of the present invention, a resilient isolation member is provided for use with an electric machine having a housing, a stator within the housing, and an end shield. The resilient isolation member generally includes first and second end portions, a sidewall extending between the first and second end portions, and a lip is disposed along an outer surface of the sidewall. The resilient isolation member is sized for mounting between the end shield and the stator, with the first and second end portions respectively abutting against a first inner portion of the end shield and a portion of the stator and with the lip abutting against a second inner portion of the end shield and a portion of the housing.

According to another aspect of the present invention, an electric machine generally includes a housing having an end portion, a stator within the housing, an end shield, and at least one resilient isolation member. The resilient isolation member includes a first end portion abutting against a first inner portion of the end shield, and a second end portion abutting against a portion of the stator. The resilient isolation member also includes a sidewall extending between the first and second end portions, and a lip disposed along an outer surface of the sidewall. The lip abuts against a second inner portion of the end shield and a portion of the housing.

Another aspect of the invention includes a method of assembling an electric machine having a housing, a stator within the housing, and an end shield. In one exemplary implementation, the method generally includes positioning at least one resilient isolation member between the end shield and the stator such that first and second end portions of the resilient isolation member respectively abut against a first inner portion of the end shield and a portion of the stator, and such that a peripheral lip of the resilient isolation member abuts against a second inner portion of the end shield and a portion of the housing.

In another exemplary implementation, a method of assembling an electric machine generally includes positioning at least one resilient isolation member between the front end shield and the stator. The method also includes resiliently coupling the rear end shield to the front end shield such that the stator is generally between the front and rear end shields. The method further includes resiliently mounting the rear end shield to external supporting structure, and hard-mounting the front end shield to external supporting structure.

Further aspects and features of the present invention will become apparent from the detailed description provided hereinafter. It should be understood that the detailed description and specific examples, while indicating exemplary embodiments of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF EXEMPLARY EMBODIMENTS

The following description of exemplary embodiments is merely exemplary in nature and is in no way intended to limit the invention, its applications, or uses.

According to one aspect of the present invention, a resilient isolation member is provided for use with an electric machine having a housing, a stator within the housing, and an end shield. The resilient isolation member includes first and second end portions, a sidewall extending between the first and second end portions, and a lip is disposed along an outer surface of the sidewall. The resilient isolation member is sized for mounting between the end shield and the stator, with the first and second end portions respectively abutting against a first inner portion of the end shield and a portion of the stator and with the lip abutting against a second inner portion of the end shield and a portion of the housing.

Accordingly, various embodiments of the present invention employ a resilient isolation member to at least partially decouple the torsional vibration transmission path to the front end shield. In such embodiments, a resilient isolation member is positioned between the front end shield and the stator to thereby substantially isolate stator torque pulsations and torsional vibrations from being transmitted to the front end shield.

An exemplary embodiment of an electric machine 100 in which a resilient isolation member of the present invention can be used is shown in the figures. As shown in FIGS. 1 through 5, the electric machine 100 includes a front end shield 104, a rear end shield 106, and a housing 108. The front and rear end shields 104 and 106 are coupled to one another with through-bolts 110 such that the end shields 104 and 106 are on opposite ends of the housing 108. Alternatively, other suitable means can be used to couple the end shields 104 and 106 to one another.

Figures 5, 5A:
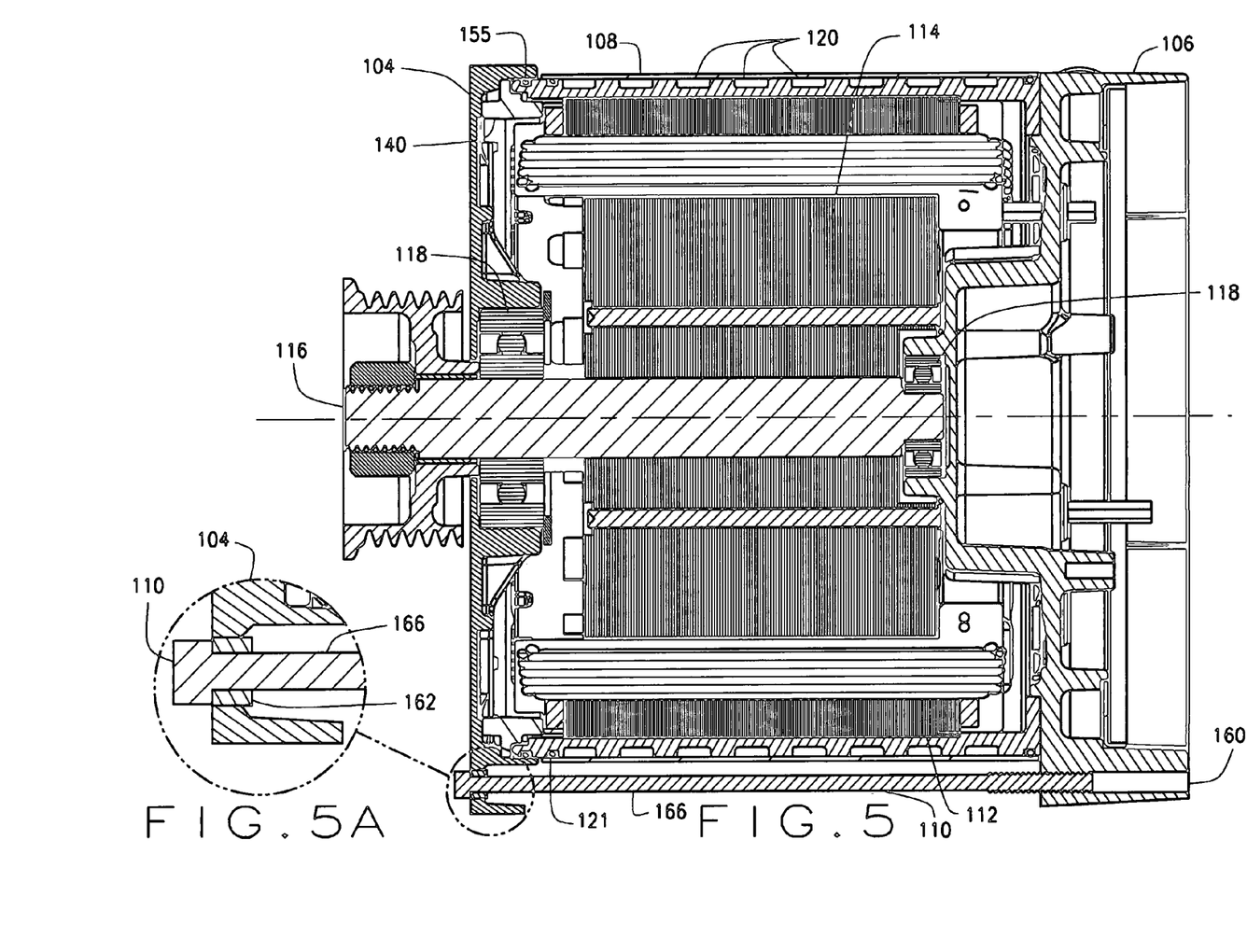
FIG. 5 is a cross-sectional view of the electric machine taken along the line 5—5 in FIG. 4.
FIG. 5A is a partial cross-sectional view illustrating a through-bolt engaged with a resilient bushing within a fastener hole shown in FIG. 5.

The electric machine 100 also includes a stator 112 and a rotor core 114 with the housing 108, as shown in FIG. 5. The rotor core 114 is coupled to a shaft 116 for common rotation therewith. The shaft 116, in turn, is rotatably supported by bearings 118.

Figure 6:
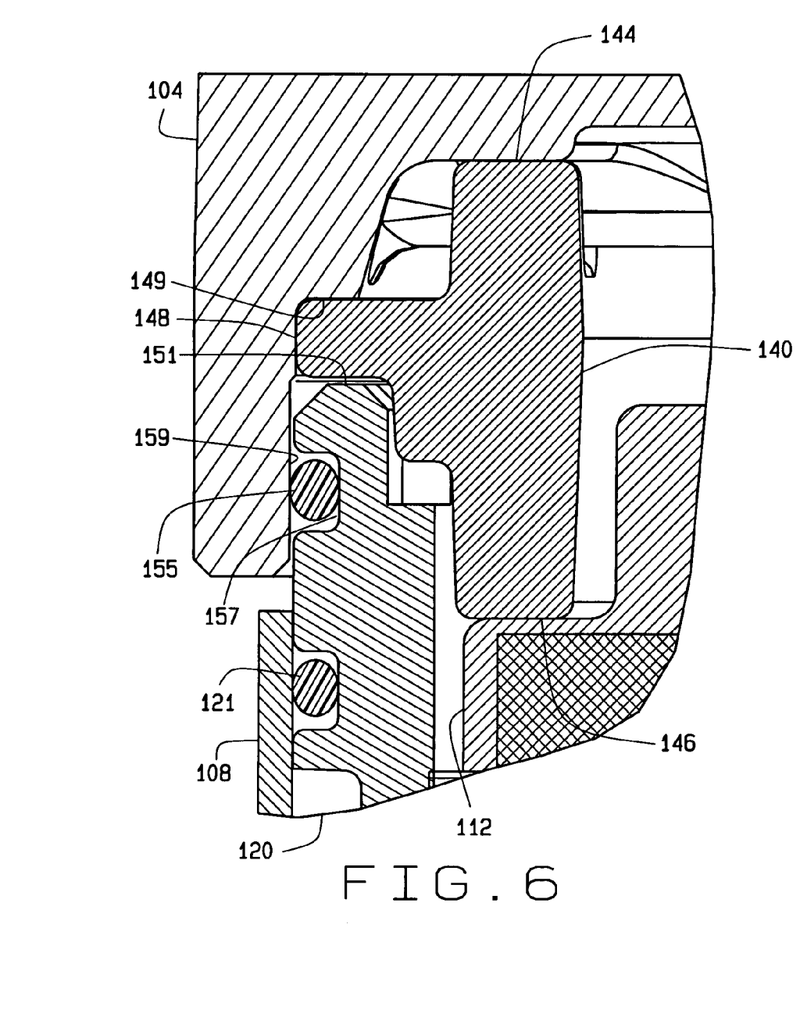
FIG. 6 is a partial cross-sectional view illustrating a resilient isolation member between the front end shield and stator shown in FIG. 5.
Figure 7:
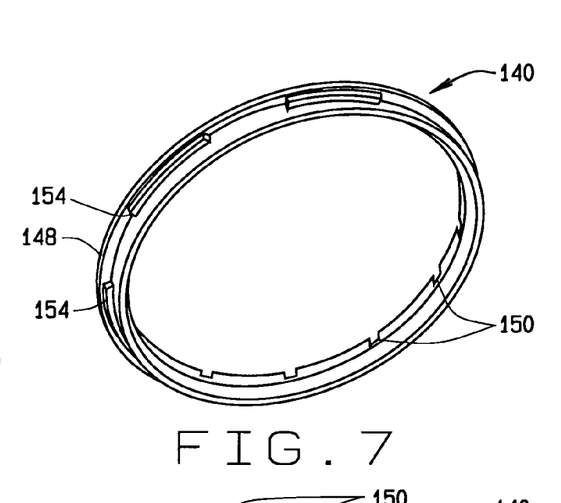
FIG. 7 is a lower perspective view of a resilient isolation member according to one embodiment of the invention.
Figure 8:
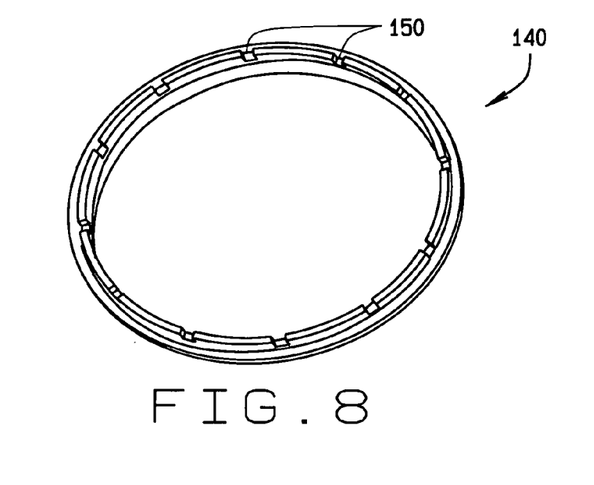
FIG. 8 is an upper perspective view of the resilient isolation member shown in FIG. 7.
Figure 9:
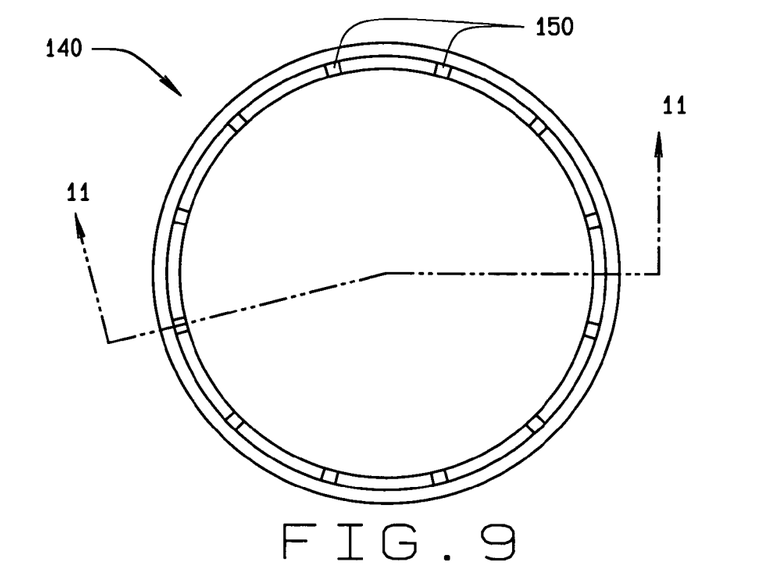
FIG. 9 is an upper plan view of the resilient isolation member shown in FIGS. 7 and 8.
Figure 10:
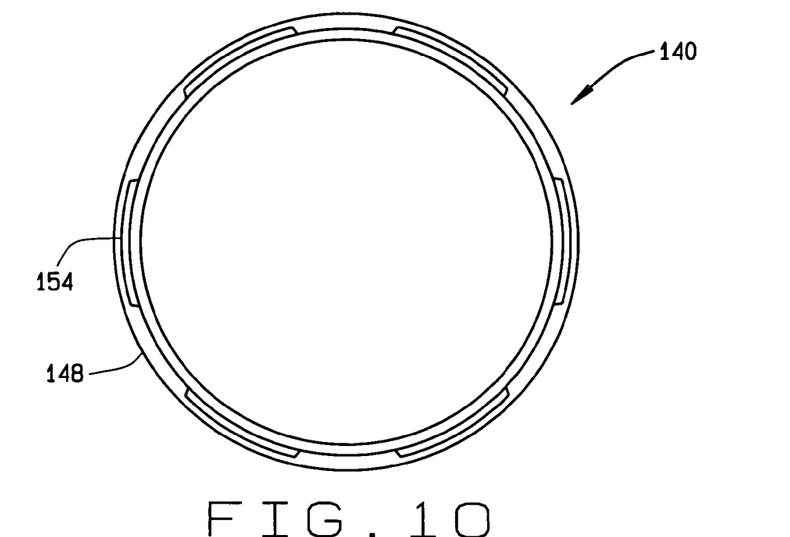
FIG. 10 is a lower plan view of the resilient isolation member shown in FIGS. 7 and 8.
Figure 11:
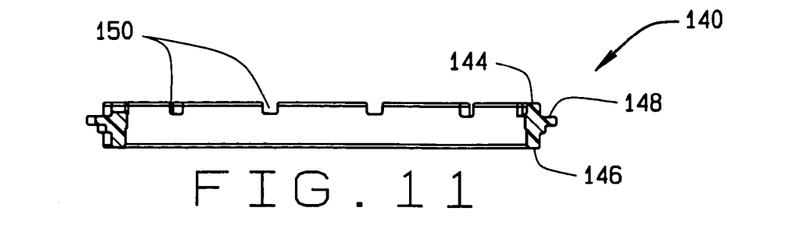
FIG. 11 is a cross-sectional view of the resilient isolation member taken along the line 11—11 in FIG. 9.
Figure 14:
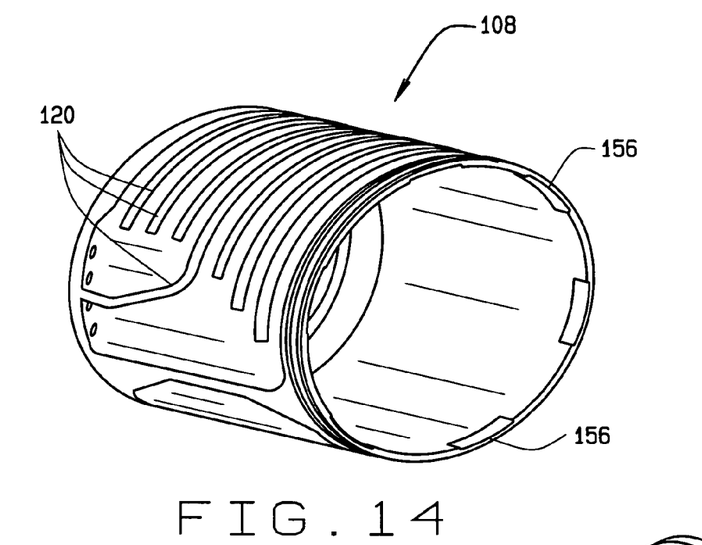
FIG. 14 is a housing that can be used with the resilient isolation member shown in FIGS. 7 through 11 according to one exemplary embodiment of the invention.

In the illustrated embodiment, the housing 108 is a liquid cooling jacket that includes a plurality of channels 120, as shown in FIGS. 5 and 14. These channels 120 allow a cooling fluid to flow therethrough to help dissipate heat from the housing 108. As shown in FIGS. 5 and 6, the O-ring 121 helps seal the channels 120 and thus inhibit liquid from leaking therefrom. The O-ring 155 is described below.

Figure 2:
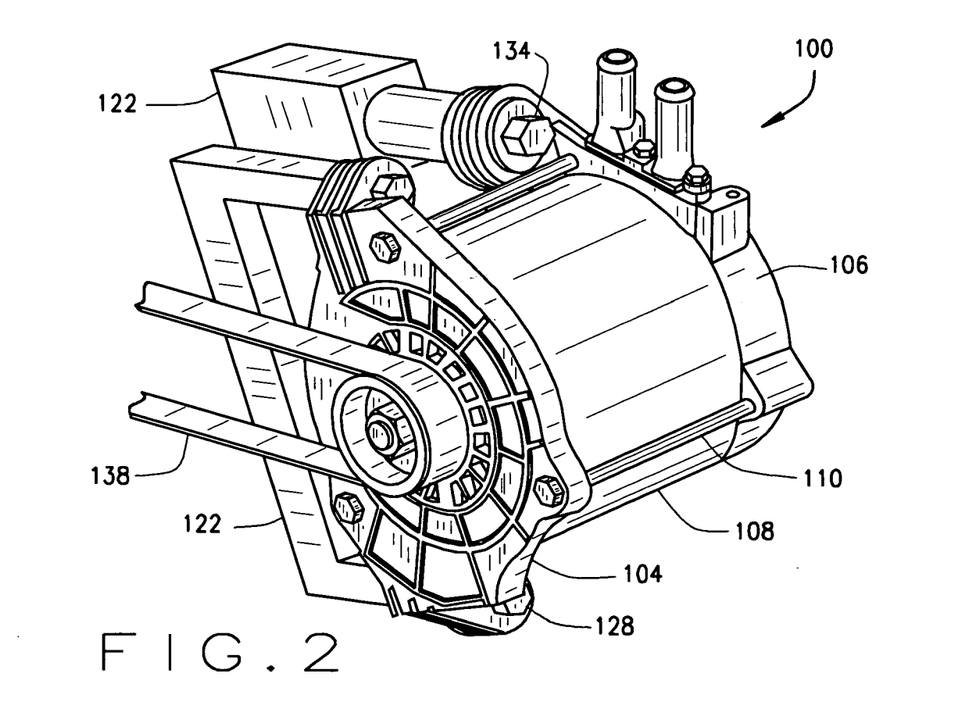
FIG. 2 is a perspective view of the electric machine shown in FIG. 1 mounted to external supporting structure according to one exemplary embodiment of the invention.
Figure 3:
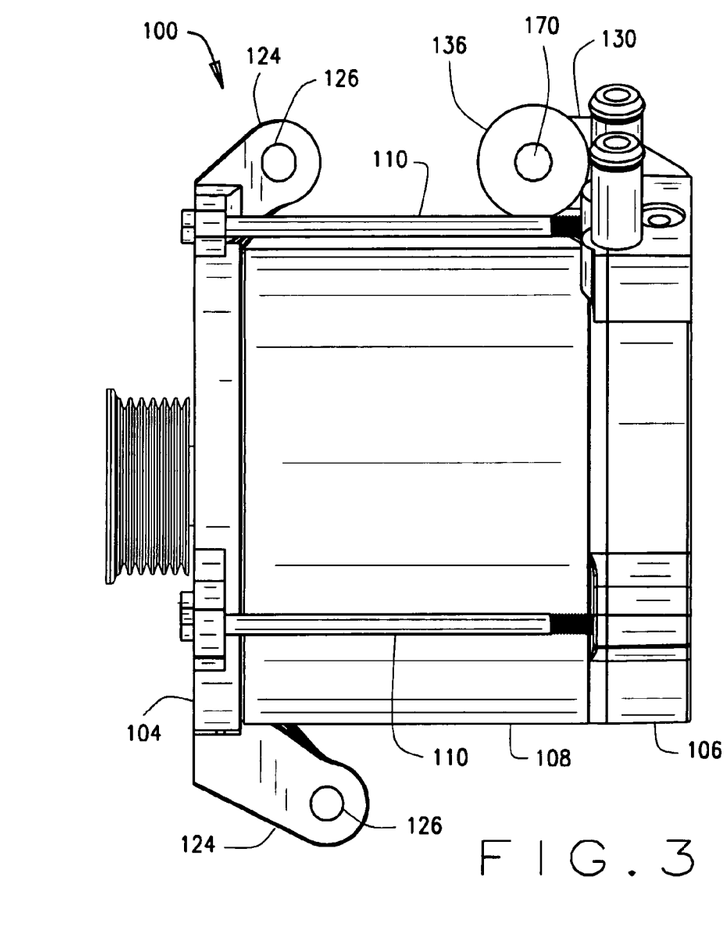
FIG. 3 is a side elevation view of the electric machine shown in FIG. 1.
Figure 4:
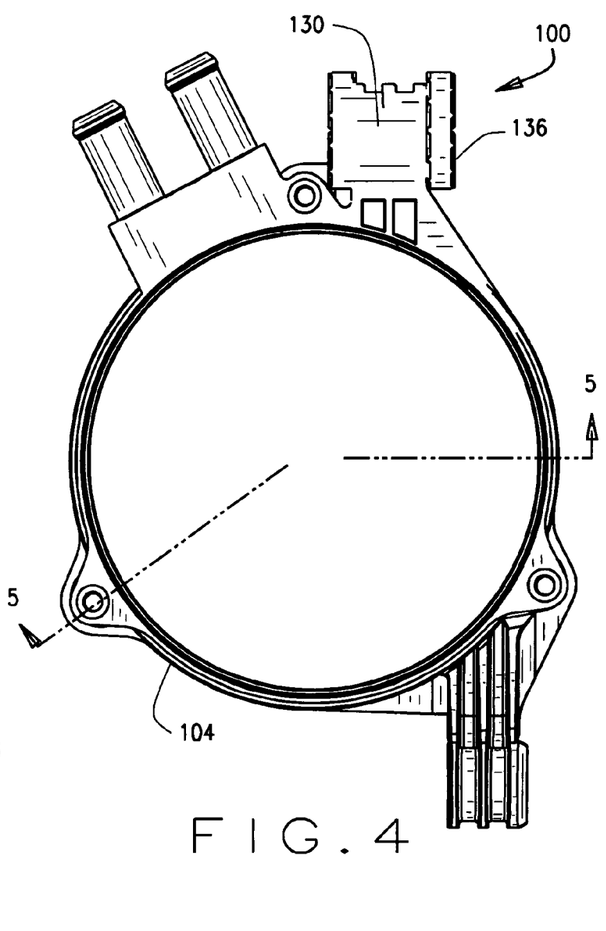
FIG. 4 is a front end plan view of the electric machine shown in FIG. 1.

As shown in FIG. 2, the electric machine 100 is mounted to external supporting structure 122. In various embodiments, the supporting structure 122 is an automobile engine. In the particular illustrated embodiment, the electric machine 100 is a liquid-cooled starter-generator using a switched reluctance (SR) motor. Alternative embodiments, however, include other types of machines such as electric motors, electric generators, liquid-cooled machines, air-cooled machines, permanent magnet (PM) motors, induction motors, variable reluctance motors, and switched reluctance machines.

The front end shield 104 includes two mounting arms 124. Each mounting arm 124 defines an opening or through-hole 126 (FIG. 1) for receiving a bolt 128 (FIG. 2) to mount the front end shield 104 to the supporting structure 122. The mounting features can be coaxial or tangential relative to the longitudinal centerline axis of the machine 100. In addition, the front end shield 104 can include more than two mounting arms 124 depending, for example, on the particular application.

The rear end shield 106 also includes a mounting arm 130. The mounting arm 130 defines an opening or through-hole (FIG. 1) for receiving bolt 134 (FIG. 2) to mount the rear end shield 106 to the supporting structure 122. The mounting features can be coaxial or tangential relative to the longitudinal centerline axis of the machine 100. In addition, the rear end shield 106 can include more than one mounting arm 130 depending, for example, on the particular application. Various embodiments also include a resilient grommet 136 engaged with the opening defined by mounting arm 130, thus providing soft or resiliently mounting of the rear end shield 106 to the supporting structure 122, as described in more detail below.

Accordingly, the illustrated electric machine 100 includes a three point mounting arrangement in which the rear end shield 106 is resiliently mounted to the support structure 122, and the front end shield 104 is hard-mounted to the supporting structure 122 at two mounting points. Alternatively, the electric machine can include a four (or more) point mounting arrangement depending, for example, on the particular application.

Hard-mounting the front end shield 104 helps maintain proper drive tension on the belt 138 (FIG. 2) and inhibits deflection of the front end shield 104 due to belt tension, thereby maintaining positioning and alignment of the front end shield 104. Further, the resilient mounting of the rear end shield 106 helps to isolate the rear engine mount from the stator torque pulsations produced by the machine 100, as described in more detail herein.

Figure 1:
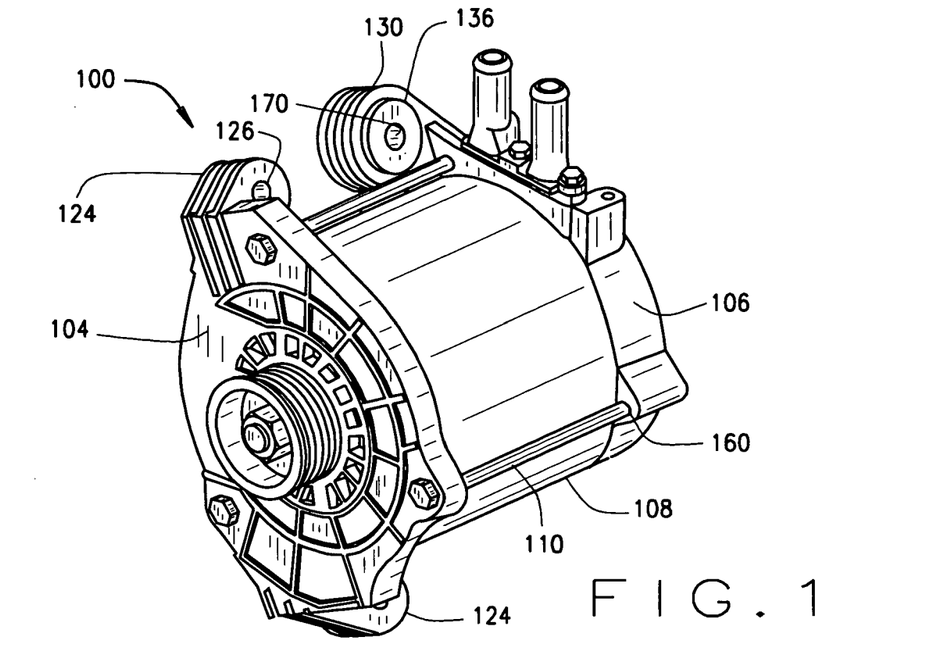
FIG. 1 is a perspective view of an electric machine according to one exemplary embodiment of the invention.

In various embodiments, the mounting arms 124 and 130 are integrally formed (e.g., integrally cast or machined, etc.) with the respective end shields 104 and 106. But in other embodiments that mounting arms 124 and 130 are separate components that are engaged (e.g., welded, etc.) to the respective end shield 104 and 106. In yet other embodiments, the end shield 104 and/or 106 can include any suitable numbers (i.e., one or more) of mounting arms arranged differently than what is shown in FIGS. 1 and 2. Further, the end shield 104 and/or 106 can instead, or additionally, include other mounting means (e.g., flanges, welding, etc.) besides mounting arms and through-bolts. In addition, the electric machine 100 can also be mounted in other orientations besides what is shown in FIG. 2, including ceiling-mounted, horizontally-mounted, vertically-mounted, side-mounted, etc.

The inventors hereof have recognized that stator torque pulsations can generate undesirable structural vibration and acoustic noise, especially during low-speed/high-power generating phases of the starter-generator. In automotive applications, this can result in undesirable noise because when the starter-generator is at its noisiest (e.g., at low-speed/high-power generation) the automobile engine is idling and thus at its quietest.

Accordingly, various embodiments advantageously reduce acoustic noise by using a resilient isolation member 140 to provide resilient mounting between the front end shield 104 and the stator 112/housing 108. This resilient mounting helps to substantially isolate the front end shield 104 from stator torque pulsations and torsional vibrations from being transmitted into the front end shield 104.

An exemplary embodiment of a resilient isolation member 140 is shown in FIGS. 7 through 11. As shown, the resilient isolation member 140 includes a generally circular annular shape having a central circular opening. In alternative embodiments, however, the resilient isolation member can define other suitable shapes, such as octagonal, hexagonal, rectangular, ovular, etc. Accordingly, embodiments of the invention should not be limited to only circular resilient isolation members. Further, the size and shape of the resilient isolation member can vary depending, for example, on the particular machine in which the resilient isolation member will be installed. And depending on the size and shape of the resilient isolation member 140, one or more components of the machine 100 can be configured to accommodate for the resilient isolation member 140. For example, in one embodiment, the front end shield 104 has a larger size to accommodate for the positioning of the resilient isolation member 140 within the front end shield 104.

Figures 12, 13:
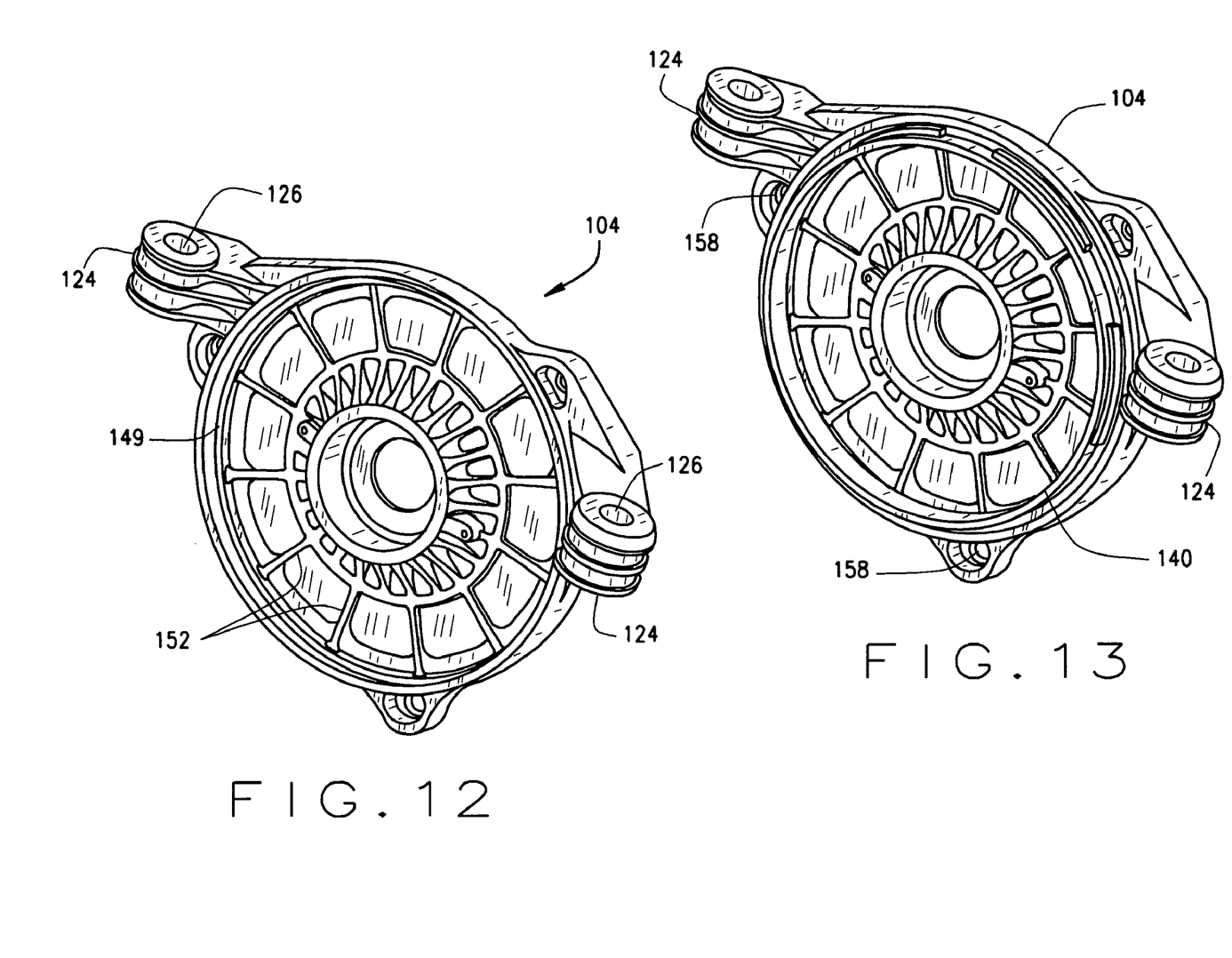
FIG. 12 is an inner perspective of a front end shield according to one exemplary embodiment of the invention.
FIG. 13 is a perspective view illustrating the resilient isolation member shown in FIGS. 7 through 11 engaged with the front end shield shown in FIG. 12.

As shown in FIGS. 5, 6, and 13, the resilient isolation member 140 is configured to be disposed within the front end shield 104. The resilient isolation member 140 includes portions 144 and 146 that respectively abut against the front end shield 104 and the stator 112, as shown in FIG. 6. Accordingly, the resilient isolation member 140 provides resilient mounting between the front end shield 104 and the stator 112.

The resilient isolation member 140 also includes a peripheral lip 148 that is configured to be disposed between an internal shoulder 149 (FIG. 12) defined by the front end shield 104 and an end portion 151 of the housing 108 (FIG. 6). Accordingly, the resilient isolation member 140 also provides resilient mounting between the front end shield 104 and the housing 108.

When internally disposed between the front end shield 104 and the stator 112/housing 108 assembly, the resilient isolation member 140 is in compression with its material in shear loading. The resilient isolation member 140 substantially decouples the torsional vibration transmission path to the front end shield 104.

The resilient isolation member 140 can include features for inhibiting creep and/or rotation of the resilient isolation member 140 relative to the end shield 104 and/or housing 108. This, in turn, can reduce wear and tear caused by friction and abrasion.

In the illustrated embodiment, the resilient isolation member 140 includes notches 150 (FIG. 11) each configured to engagingly receive a different rib 152 (FIG. 12) defined on an inner surface of the front end shield 104. Engagement of the ribs 152 with the notches 150 inhibits relative rotational movement between the resilient isolation member 140 and the end shield 104.

Each notch 150 is shown with a generally rectangular shape. Alternatively, other shapes can be employed for the notches such as triangular, ovular, semi-circular, combinations thereof, etc.

As shown, the resilient isolation member 140 includes twelve notches 150, and the end shield 104 includes twelve ribs 152. Alternatively, the resilient isolation member 140 and end shield 104 can include any suitable number (i.e., one or more) of notches 150 and ribs 152, respectively. Further, in some embodiments such as in FIG. 15, the resilient isolation member 240 does not include any notches, and the end shield 104 does not include any corresponding ribs to engage such notches.

In various embodiments, the end shield 104 and the ribs 152 can be integrally or monolithically formed as a single component. One exemplary implementation integrally casts the end shield 104 and the ribs 152 as a single component. Other suitable manufacturing processes besides casting can also be used to integrally form the end shield 104 and the ribs 152 as a single component including molding, machining, etc.

Even though the ribs 152 can be formed integrally with the end shield 104, such is not required. In other embodiments, the ribs may comprise discrete components that are separately engaged to the end shield, for example, by welding, among other suitable methods.

Aspects of the invention, however, are not limited to the particular notch 150 and rib 152 arrangement shown in the figures. For example, other embodiments include the end shield having one or more notches, and the resilient isolation member having one or more ribs configured to engage the notches of the end shield. In still further embodiments, different combinations of notches and ribs can be defined by either or both the end shield and the resilient isolation member.

In the illustrated embodiment, the resilient isolation member 140 includes tabs 154 (FIGS. 7 and 10) each configured to engage a different opening or recess 156 (FIG. 14) defined by the housing 108. Engagement of the tabs 154 with the openings 156 inhibits relative rotational movement between the resilient isolation member 140 and the housing 108.

Each tab 154 is shown with a generally rectangular shape. Alternatively, other shapes can be employed for the tabs such as triangular, among others.

Figure 15:
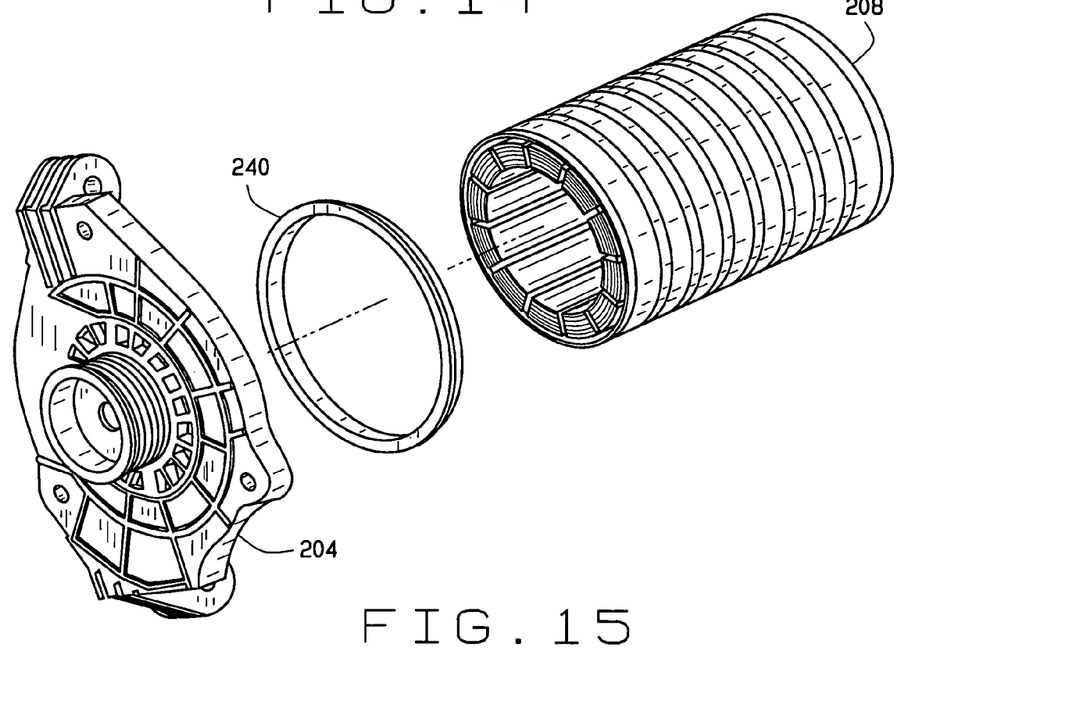
FIG. 15 is an exploded perspective view of a front end shield, resilient isolation member, and stator/housing assembly according to one exemplary embodiment of the invention.
Figure 16:
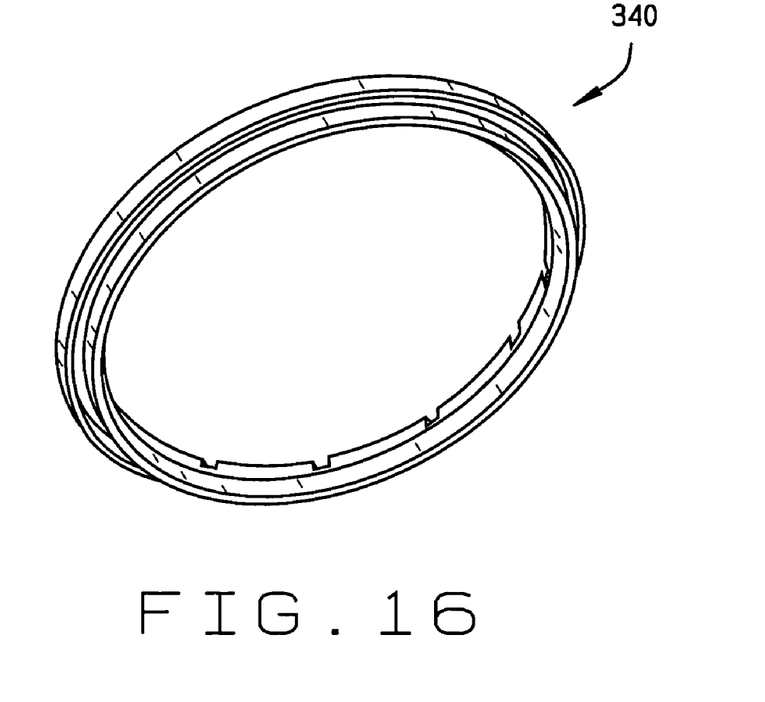
FIG. 16 is a lower perspective view of a resilient isolation member according to one embodiment of the invention.
Figure 17:
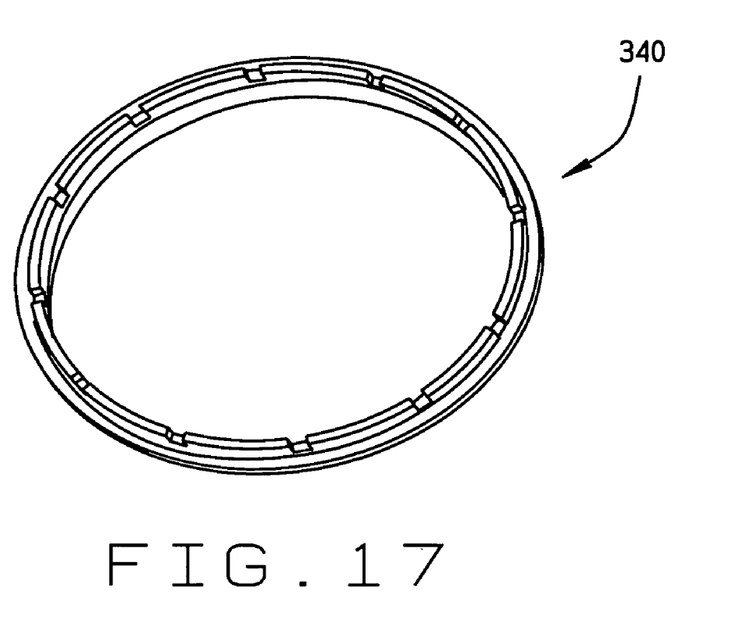
FIG. 17 is an upper perspective view of the resilient isolation member shown in FIG. 16.
Figure 18:
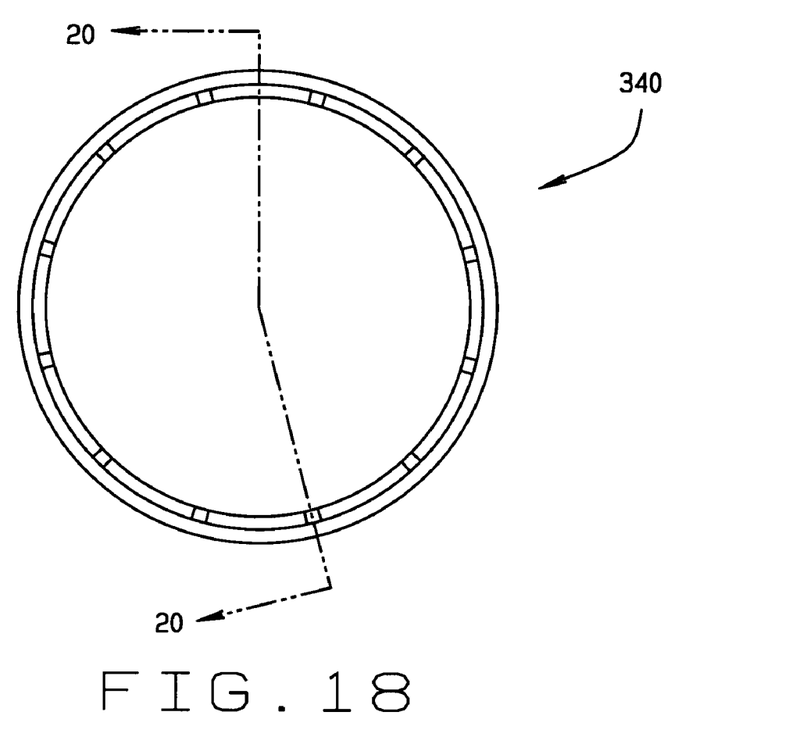
FIG. 18 is an upper plan view of the resilient isolation member shown in FIGS. 16 and 17.
Figure 19:
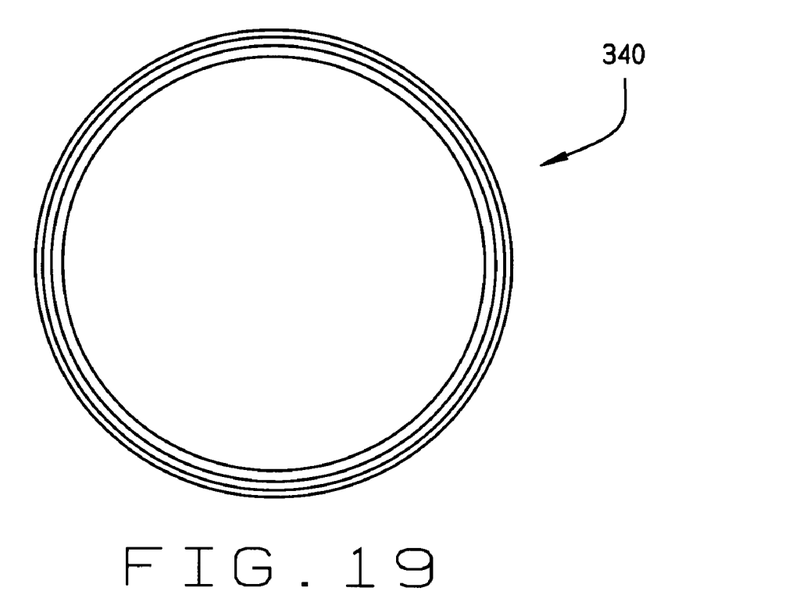
FIG. 19 is a lower plan view of the resilient isolation member shown in FIGS. 16 and 17.
Figure 20:
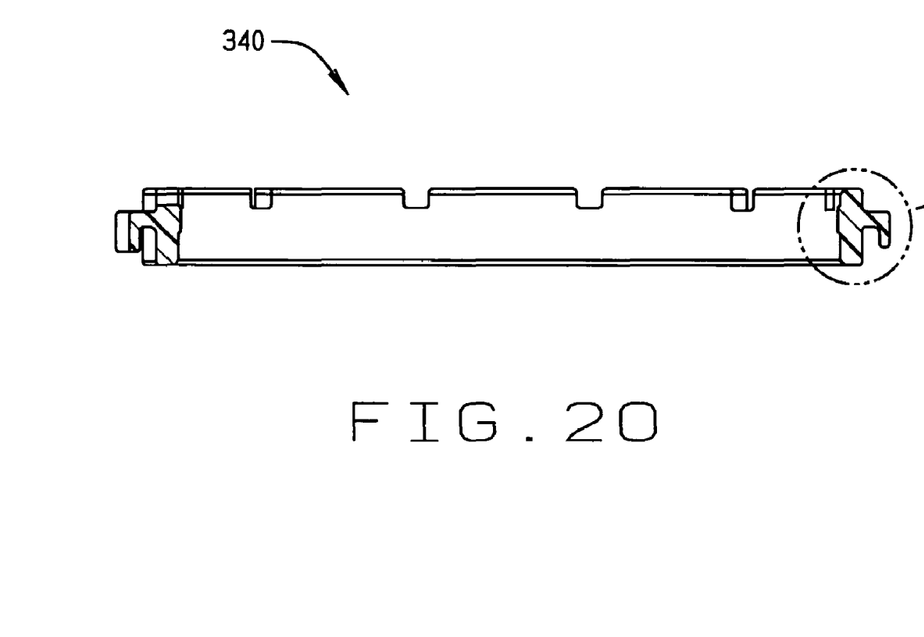
FIG. 20 is a cross-sectional view of the resilient isolation member taken along the line 20—20 in FIG. 18.
Figure 20A:
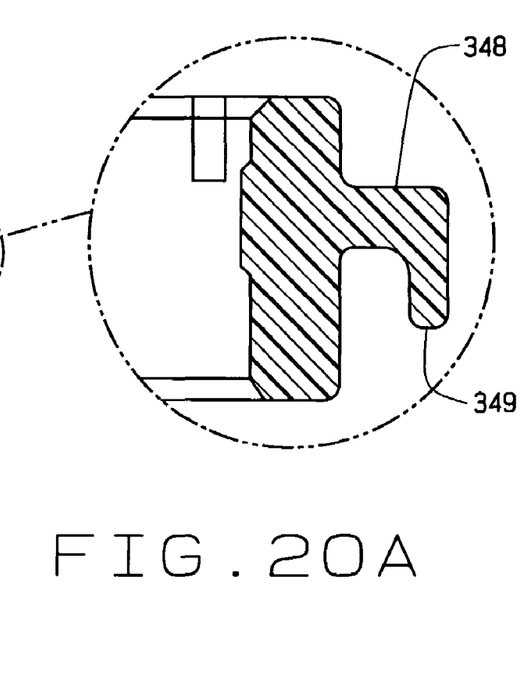
FIG. 20A is a partial cross-sectional view of the resilient isolation member shown in FIG. 20.

As shown, the resilient isolation member 140 includes six tabs 154, and the housing 108 includes six recesses 156. Alternatively, the resilient isolation member 140 and housing 108 can include any suitable number (i.e., one or more) of tabs 154 and openings 156, respectively. Further, in some embodiments such as shown in FIG. 15, the resilient isolation member 240 does not include any tabs, and the housing 208 does not include any corresponding recesses for engaging or receiving such tabs.

In various embodiments, the resilient isolation member 140 and the tabs 154 can be integrally or monolithically formed as a single component. One exemplary implementation integrally molds the resilient isolation member 140 and the tabs 154 as a single component. Other suitable manufacturing processes besides molding can also be used to form the resilient isolation member 140.

Even though the tabs 154 can be formed integrally with the resilient isolation member 140, such is not required. In other embodiments, the tabs may comprise discrete components that are separately engaged to the resilient isolation member, for example, by adhesives, among other suitable methods.

Aspects of the invention, however, are not limited to the particular tab 154 and recess 156 arrangement shown in the figures. For example, other embodiments include the housing having one or more tabs, and the resilient isolation member having one or more recesses configured to engagingly receive the tabs of the housing. In still further embodiments, different combinations of tabs and recesses can be defined by either or both the housing and the resilient isolation member.

A wide range of materials can be used for the resilient isolation member 140, such as elastomers and rubber materials. In one exemplary embodiment, the resilient isolation member 140 comprises Viton® fluoroelastomer, which is a material available from DuPont Dow Elastomers, L.L.C. of Wilmington, Del. Alternatively, other materials can be used for the resilient isolation member 140 including rubber, elastomers, nitrile, silicon, etc.

With continued reference to FIGS. 5 and 6, an O-ring 155 is disposed within the front end shield 104 between a surface 157 of the housing 108 and a surface 159 of the front end shield 104. The O-ring 155 helps create and maintain a radial clearance between those surfaces 157 and 159. The radial clearance can allow at least some relative torsional movement between the housing 108 and the front end shield 104. The O-ring 155 thus helps further isolate and decouple the vibration transmission path to the front end shield 104, and also helps maintain positioning and integrity of the machine components. In various embodiments, the O-ring 155 can also indirectly help maintain a concentric airgap between the stator 112 and the rotor.

FIGS. 16 through 20A illustrate an alternative embodiment of a resilient isolation member 340 configured to be disposed within a front end shield and provide resilient mounting between the front end shield and a stator/housing assembly. The resilient isolation member 340 includes a peripheral lip 348 configured to be disposed between an internal shoulder defined by the end shield and an end portion of the housing. The resilient isolation member 340 also includes a portion 349 downwardly depending from the peripheral lip 348. This downward projection 349 is configured to be disposed between a surface of the housing and a surface of the end shield, thus helping create and maintain a radial clearance between the surface of the end shield and the surface of the housing. Accordingly, in this embodiment of the resilient isolation member 340, the downward projection 349 can be used in the place of the O-ring 155. In addition, the generally u-shaped feature formed by portions 348 and 349 of the resilient isolation member 340 serves to fit between the front end shield and the stator housing, thereby helping to maintain concentric alignment of the components as the machine is being assembled. In various embodiments, the downward projection 349 can also indirectly help maintain a concentric airgap between the stator and the rotor.

The front and rear end shields 104 and 106 are coupled to one another on opposite ends of the housing 108. As shown, the front and rear end shields 104, 106 each include three fastener holes 158 (FIG. 13) and 160 (FIG. 5), respectively. The fastener holes 158, 160 are configured (e.g., aligned, sized, shaped, etc.) to receive through-bolts 110 for coupling the front end shield 104 to the rear end shield 106. In the illustrated embodiment, each end shield 104, 106 includes three fastener holes, although other suitable fastening arrangements can be employed, such as end shields having more or less than three fastener holes.

As shown in FIGS. 5 and 5A, resilient bushings 162 are positioned within the fastener holes 158 of the front end shield 104. Each bushing 162 is a generally hollow cylindrical member defining an opening sized to receive the shaft of a through-bolt. Alternatively, other configurations (e.g., shapes, sizes, etc.) can be used for the bushings 162 depending, for example, on the particular shape and size of the fastener hole and through-bolt.

A wide range of materials can be used for the bushings 162. In one particular embodiment, the bushings 162 are made of Viton® fluoroelastomer, which is a material available from DuPont Dow Elastomers, L.L.C. of Wilmington, Del. Alternatively, other suitable resilient materials can be used for the bushings 162 including rubber, nitrile, polyurethane, EPDM (ethylene propolyne rubber), among other suitable resilient materials.

With continued reference to FIGS. 5 and 5A, the through-bolts 110 are positioned through the bushing openings such that the resilient material forming the bushing 162 is between the shaft 166 of the through-bolts 110 and the sidewall defining the fastener hole 158. In this exemplary manner, the bushings 162 provide further resilient isolation of the front end shield 104 from stator torque pulsations by inhibiting vibration transmission to the front end shield 104 by way of the through-bolts 110.

As shown in FIGS. 1 through 4, the rear end shield 106 includes mounting arm 130. The mounting arm 130 defines an opening (FIG. 1) for receiving a bolt 134 (FIG. 2). In the illustrated embodiment, a resilient grommet 136 is engaged with the opening defined by the mounting arm 130. The grommet 136 defines an opening 170 sized to receive therethrough the shaft of bolt 134.

A wide range of materials can be used for the resilient grommet 136. Exemplary materials include rubber, nitrile, polyurethane, among other suitable resilient materials. Alternatively, other suitable means (e.g., bushings, etc.) can be employed for resiliently mounting the rear end shield 106 to the supporting structure 122.

When the bolt 134 is positioned within the grommet opening 170, the resilient material forming the grommet 136 is between the shaft of the bolt 134 and the sidewall defining the hole in the mounting arm 130. In this exemplary manner, the grommet 136 provides soft or resilient mounting between the rear end shield 106 and the supporting structure 122.

Resiliently mounting of the rear end shield 106 can advantageously further reduce structural vibrations and acoustic noise by further decoupling the vibration transmission path from the machine 100 to the supporting structure. The resilient mounting of the rear end shield 106 can provide an effective decoupling point without compromising machine alignment or belt tension.

In addition, the resilient isolation member 140 may allow at least some relative movement between the stator 112 and the front end shield 104. In many electric machine applications, the stator windings and the power and control electronics are positioned on opposite sides of the rear end shield. In such applications, the resilient mounting of the rear end shield 106 can advantageously allow the electronics to move along with the stator 112, thereby reducing stress on the connections between the stator leads and the electronics.

The inventors hereof have recognized that the front two mounting arms 124 carry a large portion (e.g., about ninety percent for some embodiments) of the belt-induced loads with the rear mounting arm 130 carrying the remainder of the belt-induced loads. Accordingly, various embodiments hard-mount the front end shield 104 to external structure 122 but resiliently mount the rear end shield 106 to external structure 122. This mounting arrangement helps maintain proper drive tension on the belt 138 (FIG. 2) and inhibits deflection of the front end shield 104 due to belt tension.

Various embodiments include a starter-generator. In such embodiments, the resilient mount for the rear end shield 106 has dual loading features as will now be described. A starter-generator provides torque to start an engine, but the starter-generator also has to absorb engine torque while generating. Accordingly, there is a torque reversal between these starting and generating operations such that the stator has a tendency to twist in one direction or the other depending on whether the starter-generator is providing torque for starting the engine, or generating. By way of example, the torque can be about three to four times larger while starting than when generating such that the twisting moment experienced by the stator can be about three to four times larger while starting. Even with such large torque differentials, however, various embodiments of the present invention provide a hard-mount for the front end shield 104 that allows large torques to be absorbed when starting, and also provide resilient isolation for when the stator is twisting in the opposite direction during generating. In addition to providing resilient operation during generating, such embodiments also provide resilient operation in starting between the front end shield and the stator. Accordingly, this means that the resilient isolation has similar bidirectional properties. In some embodiments, the mounting for the rear end shield may provide more resilience during generating than during starting. Various embodiments provide rigid and sufficiently stiff mounting to absorb the torque and reverse twisting moments caused by starting so the machine doesn't twist and drive belt alignment is maintained, while also providing sufficient resilient mounting to dampen acoustic noise while generating.

In the illustrated embodiment of FIGS. 5 and 14, the housing 108 is a liquid cooling jacket that includes a plurality of channels 120. Advantageously, resilient isolation members of the present invention can be used with a liquid cooling jacket without interfering with the integrity of the liquid seals between the rear end shield and the liquid cooling jacket. Further, various embodiments of the present invention can substantially isolate the front end shield from stator torque pulsations without requiring placement of a thermal barrier (e.g., elastomer layer, etc.) between the stator and the cooling jacket to decouple the vibration transmission path to the front end shield.

The teachings of the present invention can be applied in a wide range of machines, including electric machines, electric motors, electric generators, starter-generators, liquid cooled machines, air cooled machines, permanent magnet (PM) motors, induction motors, variable reluctance motors, vehicles (e.g., automobiles, hybrid automobiles, etc.), and switched reluctance motors that include one or more resilient isolation members of the present invention. Accordingly, the specific references to liquid cooled starter-generators and electric machines should not be construed as limiting the scope of the present invention to any specific form/type of machine. Further, aspects of the invention should also not be limited to use with only automotive applications. That is, aspects of the invention include electric machines, electric motors, electric generators, starter-generators, liquid cooled motors, air cooled motors, permanent magnet (PM) motors, induction motors, variable reluctance motors, vehicles (e.g., automobiles, etc.), and switched reluctance motors that include one or more resilient isolation members of the present invention. Still yet other aspects of the invention include methods of assembling and/or mounting a machine to external supporting structure.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A resilient isolation member for an electric machine having a housing, a stator within the housing, and an end shield, the resilient isolation member comprising a first end portion, a second end portion, a sidewall extending between the first and second end portions, and a lip disposed along an outer surface of the sidewall, the resilient isolation member being sized for mounting between the end shield and the stator, with the first and second end portions respectively abutting against a first inner portion of the end shield and a portion of the stator and with the lip abutting against a second inner portion of the end shield and a portion of the housing.

2. The resilient isolation member of claim 1, wherein the sidewall defines a generally annular shape having a central opening.

3. The resilient isolation member of claim 1, further comprising a portion downwardly depending from the lip and configured to be disposed between a surface of the housing and a surface of the end shield for maintaining a radial clearance between the surface of the end shield and the surface of the housing.

4. The resilient isolation member of claim 1, further comprising at least one notch configured to engage at least one rib defined by the end shield such that the engagement of the notch with the rib inhibits relative rotational movement between the resilient isolation member and the end shield.

5. The resilient isolation member of claim 1, further comprising at least one tab configured to engage at least one opening defined by the housing of the electric machine such that the engagement of the tab with the opening inhibits relative rotational movement between the resilient isolation member and the housing.

6. An electric machine comprising a housing including an end portion, a stator within the housing, an end shield, and at least one resilient isolation member providing resilient mounting between the end shield and the stator, the resilient isolation member including a first end portion abutting against a first inner portion of the end shield, a second end portion abutting against a portion of the stator, a sidewall extending between the first and second end portions, a lip disposed along an outer surface of the sidewall, the lip abutting against a second inner portion of the end shield and a portion of the housing.

7. The machine of claim 6, wherein the end shield is a front end shield, and wherein the machine further comprises a rear end shield coupled to the front end shield with at least one mechanical fastener received within at least one fastener hole defined by the front end shield, and at least one resilient bushing including at least a portion disposed between at least a portion of the mechanical fastener and at least a portion of a sidewall defining at least a portion of the fastener hole.

8. The machine of claim 7, further comprising at least one resilient mount for resiliently mounting the rear end shield to external supporting structure.

9. The machine of claim 8, wherein the resilient mount includes at least one resilient grommet engaged with an opening defined by a mounting arm of the rear end shield.

10. The machine of claim 8, wherein the rear end shield is resiliently mounted to external supporting structure with the resilient mount, and wherein the front end shield is hard-mounted to external supporting structure.

11. The machine of claim 6, further comprising at least one O-ring disposed within the end shield between a surface of the housing and a surface of the end shield for maintaining a radial clearance between the surface of the end shield and the surface of the housing.

12. The machine of claim 6, wherein the resilient isolation member includes a portion downwardly depending from the lip and configured to be disposed between a surface of the housing and a surface of the end shield for maintaining a radial clearance between the surface of the end shield and the surface of the housing.

13. The machine of claim 6, wherein the housing comprises a liquid cooling jacket.

14. The machine of claim 6, wherein the end shield is a front end shield, and wherein the machine further comprises a rear end shield coupled to the front end shield, and at least one resilient mount for resiliently mounting the rear end shield to external supporting structure.

15. The machine of claim 14, wherein the resilient mount includes at least one resilient grommet engaged with an opening defined by a mounting arm of the rear end shield.

* * * * *